United States Patent [19]

Boghosian

[11] 3,862,146
[45] Jan. 21, 1975

[54] OXIDATION OF BUTANE TO MALEIC ANHYDRIDE

[75] Inventor: Edward M. Boghosian, Fort Lee, N.J.

[73] Assignee: Standard Oil Company, Chicago, Ill.

[22] Filed: Oct. 27, 1972

[21] Appl. No.: 301,613

Related U.S. Application Data

[63] Continuation-in-part of Ser. No. 215,176, Jan. 3, 1972, abandoned.

[52] U.S. Cl. ............................... 260/346.8 A
[51] Int. Cl. .................................. C07c 55/10
[58] Field of Search ..................... 260/346.8 X

[56] References Cited
UNITED STATES PATENTS

| | | | |
|---|---|---|---|
| 2,260,409 | 10/1941 | Slotterbeck et al. | 260/533 |
| 2,773,921 | 12/1956 | Rylander et al. | 260/683.15 |
| 3,156,706 | 11/1964 | Kerr | 260/346.8 |

FOREIGN PATENTS OR APPLICATIONS 205,854   11/1970   Germany

*Primary Examiner*—Henry R. Jiles
*Assistant Examiner*—Mildred A. Crowder
*Attorney, Agent, or Firm*—Gunar J. Blumberg; Arthur G. Gilkes; William T. McClain

[57] ABSTRACT

The oxidation of butane to maleic anhydride in the presence of a phosphorus-vanadium-oxygen complex catalyst is enhanced by the addition to the catalyst of a zinc, bismuth, copper or lithium activator. The yield of the oxidation may be increased as much as 50% without any loss in selectivity to maleic anhydride.

12 Claims, No Drawings

OXIDATION OF BUTANE TO MALEIC ANHYDRIDE

DESCRIPTION OF THE INVENTION

This application is a continuation-in-part of U.S. Pat. application, Ser. No. 215,176 filed Jan. 3, 1972, and now abandoned.

This invention relates to the oxidation of butane with molecular oxygen to form maleic anhydride. More particularly, the invention relates to the improvement of the phosphorus-vanadium-oxygen complex catalyst system by incorporating a specific activator into such catalyst. As used herein, "activator" is either zinc, bismuth, copper or lithium, or any combination thereof, which is introduced into the catalyst preparation either as the element itself or as a salt of the element.

It has long been considered desirable to prepare maleic anhydride from the oxidation of n-butane. Considerable research effort has been expended in this area, but the process never reached commercial feasibility because of the inadequacy of the yields of maleic anhydride. Presently, the greatest interest is in catalytic vapor phase oxidation, and, in particular, in catalyst improvement. For example, U.S. Pat. No. 3,293,268 proposed that the oxidation be performed in the presence of a phosphorus-vanadium-oxygencontaining complex catalyst. Though this catalyst is effective in the oxidation, it does not give sufficiently high yields. Yields of maleic anhydride of only 30 to 50% are reported. Furthermore, even these low yields require severe reaction conditions which are detrimental to catalyst life and product stability.

In accordance with this invention, it has now been discovered that phosphorus-vanadium-oxygen catalysts, such as disclosed in the aforesaid patent, can be substantially and unexpectedly activated by treating the catalyst with an activator prepared as hereinafter described. By following the teaching of the invention, yields of maleic anhydride of over 80% can be obtained at relatively mild reaction conditions. As used herein, "yield" is the weight of maleic anhydride obtained divided by the weight of butane feed multiplied by one hundred.

It is preferred to prepare the catalyst by refluxing the vanadium, phosphorus, and activator components together. Other methods, of course, may also be used. It is, however, desirable to employ a technique which forms a highly crystalline, rather than a substantially amorphous catalyst.

In preparing the active catalyst, the atomic ratio of phosphorus to vanadium should be maintained from about 0.5 to 5, preferably one to two atoms of phosphorus per atom of vanadium. Most preferably, the ratio is from about 1.1 to 1.6 atoms of phosphorus per atom of vanadium. The catalyst activator should be present in a ratio from about 0.05 to about 0.50 atoms per atom of vanadium, and more preferably from about 0.1 to about 0.35 atoms per atom of vanadium. In the case of zinc, the aforesaid ratio is equal to about 0.5 to 15% by weight, preferably from about 3% to 10%, of zinc based on the total weight of the reactants, i.e., the zinc chloride, vanadium pentoxide and phosphoric acid. (See Example 1, Part B, below, where the weight % zinc is 5.7% and the atomic ratio 1.15/1/0.19.)

The catalysts are prepared by combining the vanadium with a phosphorus compound. When a vanadium oxysalt is combined with the phosphorus compound a vanadium-oxygen-phosphorus complex is formed. The vanadium oxysalt may be added as such or formed in situ during the preparation of the vanadium-oxygen-phosphorus complex. Thus, for example, the vanadium oxysalt may be preformed and the phosphorus compound then added or the vanadium oxide, phosphorus compound and salt forming acid mixed simultaneously with the oxysalt being formed in situ. The method whereby the oxysalt is preformed is the preferred method.

The catalyst activator may be introduced into the catalyst in a number of ways. The method of introduction may be any method which results in the added activator being intimately combined with the vanadium-oxygen-phosphorus complex. The activator may be added during the preparation of the vanadium-oxygen-phosphorus complex, or the complex may first be prepared and the activator added either before, at the same time, or after either the vanadium or phosphorus compound is added. The activator may be added before, after, or at the same time as the carrier, if any, is added.

As noted previously, catalyst complexes which are prepared by a solution or "reflux" method are preferred. For example, if vanadium oxychloride is used, the solvent may be concentrated hydrochloric acid. The vanadium oxychloride solution may be readily obtained by dissolving vanadium pentoxide in concentrated hydrochloric acid. The phosphorus may then be introduced by adding a phosphorus compound such as phosphoric acid, $P_2O_5$ or POCl, to the vanadium oxychloride to form the vanadium-oxygen-phosphorus complex dissolved in the hydrochloric acid. The added catalyst activator is normally dissolved along with the vanadium pentoxide in hydrochloric acid, or if, for example, vanadium oxychloride is the starting material, it may be dissolved in a solution thereof prior to the addition of the phosphorus compound. The rate of formation of the complex may be increased with the use of heat.

The vanadium oxysalt used in the preparation of the catalyst may desirably contain, as the salt forming anion, any anion of an acid which is more volatile than the anion of phosphoric acid and which is not normally an oxidizing agent for vanadium during the catalyst preparation. The acid precursor of the anion may be either organic or inorganic. Acids such as hydrochloric, hydroiodic, hydrobromic, acetic, oxalic, malic, citric, formic and mixtures thereof, such as a mixture of hydrochloric and oxalic, may be used. Less desirably, sulfuric and hydrofluoric may be employed. Other reducing agents which may be employed, but which have not given as desirable catalysts are organic aldehydes such as formaldehyde and acetaldehyde; alcohols such as pentaerythritol, diacetone alcohol and diethanolamine, and additional reducing agents, such as hydroxyl amines, hydrazine, sulphur dioxide and nitric oxide. Nitric acid and similar oxidizing acids, which would oxidize the vanadium from a valence of 4 to 5 during the preparation of the catalyst, should be avoided. Vanadium oxysalts formed from the inorganic acids have given excellent results. The best results are obtained using the salt from hydrochloric acid; that is, using vanadium oxychloride.

Although the catalysts may be separately formed and used as pellets, it is more economical and practical to deposit this material on a carrier. Before the carrier is combined with the catalyst, the solution of catalyst is preferably concentrated to a solution which contains from about 30 to 80% volatiles. Even better results are obtained when there is from about 50 to 70% volatiles by weight. The carrier may be added to the catalyst solution or the catalyst solution may be poured onto the carrier. Less desirably, the carrier may be present during the whole course of reactions to provide the desired vanadium-oxygen-phosphorus complex.

The support or carrier for the vanadium-oxygen-phosphorus complex, if any, should be inert to the deposition solution containing the complex and stable under the catalytic oxidation conditions. The support not only provides the required surface for the catalyst, but gives physical strength and stability to the catalyst material. The carrier or support generally has a low surface area, i.e., from about .01 to about 5 square meters per gram. A desirable form of carrier is one which has a dense non-absorbing center and a rough surface to retain the catalyst thereon. The carrier may vary in size, but preferably is from about 2 ½ mesh to about 10 mesh in the Tyler Standard screen size. Carrier particles smaller than 10 to 12 mesh normally cause an undesirable pressure drop in the reactor. Any of the other inert carriers of low surface, such as silicon carbides, alumina and silica gel, may be employed.

The amount of the catalyst complex on the carrier may be varied from about 10 to about 30 weight percent, and preferably from about 14 to about 24 weight percent. These amounts of the catalyst complex are normally enough to substantially coat the surface of the carrier. With more absorbent carriers, larger amounts of material will be required to obtain complete coverage. In the case of silicon carbide, about 25 percent of catalyst is normally used. Excess catalyst over that required to coat the carrier surface will usually be lost by mechanical attrition. The final particle size of the catalyst particles which are coated on a carrier will also preferably be about 2 ½ to about 10 mesh size. The carriers may be of a variety of shapes, preferably cylinders or spheres.

Inert diluents such as silica may be present in the catalyst, but the combined weight of the vanadium, oxygen, phosphorus and catalyst activator should preferably constitute at least 50 weight percent of the composition which is coated on the carrier. Preferably these components constitute at least about 75 weight percent of the composition coated on the carrier, and more preferably at least about 95 weight percent.

Although more economical use of the catalyst on a carrier in fixed beds is obtained, the catalyst may be employed in fluid bed systems. Of course, the particle size of the catalyst used in fluidized beds is quite small, varying from about 10 to about 150 microns. In such systems the catalyst normally will not be provided with a carrier, but will be formed into the desired particle size after drying from solution.

The vapor phase oxidation of the n-butane is carried out at a temperature of from 300° to 650° C, preferably from 400° to 550° C. Contact times over the catalyst are from 0.05 to 5 seconds, preferably from 0.1 to 1.5 seconds. Lower temperatures favor long catalyst life, but longer contact times are required.

The butane is fed to the catalytic reaction zone and mixed with air or other molecular oxygen containing gas. The optimum mixture is dependent on whether fixed bed or fluid bed is used. Where air is used, the mole percent butane ranges from 0.1 to 4, preferably from 0.5 to 1.6, for a fixed bed process and from 1 to 20, preferably from 2 to 6, for a fluid bed process. The stoichiometric ratio of oxygen to butane is generally from 1 to 100, preferably 4 to 20. Due regard must be given, in the case of fixed bed operation, in selecting the concentrations of oxygen and butane to the explosive limits of the mixture.

The pressure in the reactor is not generally critical, and the reaction may be conducted at atmospheric, superatomospheric, or below atmospheric pressure. The exit pressure will be at least slightly higher than the ambient pressure to insure a positive flow from the reaction. The pressure of the inert gases must be sufficiently high to overcome the pressure drop through the reactor.

A variety of feedstocks containing butane may be fed to the reactor. Pure butane may be introduced with air. Butane-isobutane, butane-butene, butane-butadiene and combinations thereof may also be used. Preferably the feedstock should contain at least 50% butane.

In order to illustrate the invention more fully, attention is directed to the following examples:

EXAMPLE I

This example shows the preparation of a phosphorus-vanadium-oxygen complex catalyst of the prior art, which is used as a control in Example II, and the activated catalysts of the invention:

Part A

The conventional catalyst is prepared by refluxing 67.2 g. (0.37 mole) of vanadium pentoxide in the presence of 875 ml. concentrated hydrochloric acid. After 4 hours refluxing, 97.3 g. of 85% phosphoric acid (0.843 mole) is added, followed by 6 more hours of refluxing, then cooling to room temperature and evaporating the solution to dryness. The solid residue is heated at 350° C for 6 hours, powdered and passed through a 30 mesh screen. To the powder is added enough graphite to make a 5 Wt. % mixture and then pelletized to ⅛ inch size pellets. The P/V ratio in this catalyst is 1.15/1. An all glass reactor of 4.64 ml. capacity is filled with catalyst pellets prepared as described above. After seasoning the pellets with the feedstock at reaction conditions for 6 hours, samples of the feed and effluent gases are analyzed for butane, oxygen, carbon dioxide and carbon monoxide. The effluent gas is passed through a cold trap and the condensed material is analyzed for maleic anhydride.

Part B

The preferred catalyst of the invention is prepared by refluxing for four hours 67.2 g. (0.37 mole) of vanadium pentoxide in the presence of 875 ml. concentrated hydrochloric acid. Then 19.0 g. of zinc chloride (0.14 mole) is added and refluxing continued for another 2 hours. To the solution is then added 97.3 g. of 85% phosphoric acid (0.843 mole) followed by 6 more hours of refluxing, cooling to room temperature, and evaporating the solution to dryness. The solid residue is heated at 350° C for three-four hours, powdered and passed through a 30 mesh screen. To the greenish powder is added enough graphite to make a 5 Wt. % mixture and then pelletized to ⅛ inch size. The P/V/Zn atomic ratio in this catalyst is 1.15/1/0.19. This catalyst is employed in oxidizing n-butane as described in Examples II to IV.

Part C

The bismuth activated catalyst is prepared using the procedure shown in Part B, except 30.9 g. of bismuth chloride is substituted for the zinc salt. The P/V/Bi atomic ratio of the catalyst is 1.15/1/0.19. The catalyst is used to oxidize n-butane to maleic anhydride and the results are included in Example II, Table A.

Part D

The copper activated catalyst is prepared using the procedure shown in Part B, except 13.2 g. of copper (II) chloride is substituted for the zinc salt. The P/V/Cu atomic ratio of the catalyst is 1.14/1/0.19. The catalyst is used to oxidize n-butane to maleic anhydride and the results are included in Example II, Table A.

Part E

The lithium activated catalyst is prepared using the procedure shown in Part B, except 4.16 g. of lithium chloride is substituted for the zinc salt. The P/V/Li atomic ratio of the catalyst is 1.14/1/0.19. The catalyst is used to oxidize n-butane to maleic anhydride and the results are included in Example II, Table A.

EXAMPLE II

This example shows the dramatic effect on yield improvement obtained by following the teachings of the instant invention. All the runs are carried out in glass reactors having internal volumes of about 4 to 5 cc. at a temperature of about 450°C, a contact time of about 1.0 seconds and with a feedstock containing 1.0 to 1.4 volume percent butane in air. The results are as follows:

Table A

| Run No. | Catalyst | Atomic Ratio | Yield of Maleic Anhydride |
| --- | --- | --- | --- |
| 1 | P/V | 1.15/1 | 52 |
| 2 | P/V/Zn | 1.15/1/0.04 | 51 |
| 3 | P/V/Zn | 1.15/1/0.08 | 76 |
| 4 | P/V/Zn | 1.15/1/0.19 | 86 |
| 5 | P/V/Bi | 1.15/1/0.19 | 63 |
| 6 | P/V/Cu | 1.14/1/0.19 | 77 |
| 7 | P/V/Li | 1.14/1/0.19 | 62 |

The above table shows that maleic anhydride yields in excess of 80 weight percent can be obtained by using the catalyst activators in required concentration. The use of no activator or low amounts of activator, e.g., less than 0.05 atoms per atom of vanadium, give inferior results.

EXAMPLE III

This example illustrates the outstanding life of the catalyst used in the invention for the oxidation of butane. In the following runs 1 volume % butane in air was fed to a reactor similar to that used in Example II, at a temperature of 500°C and at a contact time of 0.4 seconds. The reactor operated continuously for over 1 ½ months. The preparation of the catalyst used is described in Example I, Part B. The reaction product is sampled periodically and analyzed. The results obtained are shown in Table B:

Table B

| Days on Stream | Weight Percent Yield |
| --- | --- |
| 1 | 78 |
| 2 | 73 |
| 7 | 70 |
| 13 | 70 |
| 15 | 72 |

The above table shows that over the test period there is little catalyst deactivation.

EXAMPLE IV:

Here a series of runs is performed at temperatures of about 480°, 450° and 400° C. The catalyst is that prepared in Example I, Part B. The following results are obtained:

Table C

| Temp. C | Contact Time, Secs. | Weight Percent Yield |
| --- | --- | --- |
| 500 | 0.4 | 75 |
| 500 | 1.0 | 55 |
| 483 | 0.41 | 74 |
| 476 | 1.49 | 94 |
| 458 | 0.40 | 65 |
| 447 | 1.05 | 82 |
| 448 | 1.45 | 92 |
| 400 | 0.39 | 6 |
| 401 | 1.45 | 25 |
| 401 | 2.98 | 63 |

These runs show that the best results are obtained at 450° to 480° C at contact times of from .4 to 1.5 seconds. Even at the lowest temperature, i.e., 400° C, good yields of maleic anhydride are obtained at the 2.98 second contact time.

COMPARATIVE EXAMPLE

This example shows that other elemental additives do not share the unique ability of zinc, bismuth, copper and lithium to activate the phosphorus-vanadium-oxygen catalyst.

The catalysts listed in Table D were prepared in the manner described in Part B, Example I, with the exception that the listed elements were substituted for zinc. The reaction conditions are the same as those described in Example II.

Table D

| Run No. | Catalyst | Atomic Ratio | Yield of Maleic Anhydride |
| --- | --- | --- | --- |
| 1 | P/V/Fe | 1.15/1/0.2 | 5 |
| 2 | P/V/Mn | 1.15/1/0.19 | 23 |
| 3 | P/V/Sn | 1.15/1/0.16 | 23 |
| 4 | P/V/Cr | 1.15/1/0.19 | 19 |

The above table clearly shows that the listed catalysts are markedly inferior to the unactivated P/V catalyst.

What is claimed is:

1. A process for the preparation of maleic anhydride which comprises: contacting a feedstock consisting essentially of 50% at least n-butane and a gas containing molecular oxygen in the vapor phase with a catalyst complex consisting essentially of phosphorus, vanadium, oxygen and a metal activator selected from zinc, copper, bismuth, lithium or a mixture of these, said catalyst complex comprising from about 0.5 to 5 atoms of phosphorus for each atom of vanadium and from 0.05 to 0.5 atoms of said metal activator for each atom of vanadium.

2. The process of claim 1 wherein the activator is zinc.

3. The process of claim 1 wherein the activator is bismuth.

4. The process of claim 1 wherein the activator is copper.

5. The process of claim 1 wherein the activator is lithium.

6. The process of claim 1 wherein from 0.1 to 0.35 atoms of the activator is present for each atom of vanadium.

7. The process of claim 1 wherein there is one to two atoms of phosphorus present for each atom of vanadium.

8. The process of claim 1 wherein the temperature is from 300° to 650° C.

9. The process of claim 1 wherein the contact time is from 0.05 to 5.0 seconds.

10. The process of claim 1 wherein a fixed bed catalyst is used and the feedstock contains 0.1 to 4.0 mole percent butane.

11. The process of claim 10 wherein the feedstock contains 0.5 to 1.6 mole percent butane.

12. The process of claim 1 wherein a fluid bed catalyst is used and the feedstock contains 1 to 20 mole percent butane.

* * * * *